United States Patent
Schloss

[11] Patent Number: 5,569,379
[45] Date of Patent: Oct. 29, 1996

[54] GRIT COLLECTOR FOR WASTE WATER TREATMENT FACILITY

[75] Inventor: Charles M. Schloss, Englewood, Colo.

[73] Assignee: Schloss Engineered Equipment, Inc., Aurora, Colo.

[21] Appl. No.: 273,562

[22] Filed: Jul. 11, 1994

[51] Int. Cl.⁶ .......................... B01D 21/24; B01D 21/26
[52] U.S. Cl. .................... 210/257.1; 210/512.3; 210/523; 210/532.1
[58] Field of Search ................. 210/257.1, 319, 210/512.3, 532.1; 209/169

[56] References Cited

U.S. PATENT DOCUMENTS 3,941,698   3/1976   Weis ........................... 210/319
4,107,038   8/1978   Weis ........................... 210/532.1
4,519,907   5/1985   Rooney ....................... 210/532.1
4,767,532   8/1988   Weis ........................... 210/532.1

Primary Examiner—David A. Reifsnyder
Attorney, Agent, or Firm—Davis, Graham & Stubbs LLP

[57] ABSTRACT

A grit chamber for removing grit and other dense inorganic materials from a waste water stream in a waste water treatment facility. The grit chamber includes an upper settling chamber and a lower grit collection chamber, separated by a divider with one or more holes therethrough near the center portion to allow grit to pass. The settling chamber is substantially cylindrical, but with a transition curve connecting the inlet to the cylindrical portion, to assist in the production of a forced vortex with a minimum of turbulence.

14 Claims, 1 Drawing Sheet

GRIT COLLECTOR FOR WASTE WATER TREATMENT FACILITY

FIELD OF THE INVENTION

The present invention relates to the field of grit collectors for use in waste water treatment facilities. In particular, the invention relates to a grit collector utilizing an approximately cylindrical settling chamber with and involute curved inlet portion to produce a flow pattern such as a forced vortex.

BACKGROUND OF THE INVENTION

Waste water entering a waste water treatment facility normally includes a substantial quantity of sand, grit and plastic, in addition to suspended organic matter. One of the first steps in treating the waste water is to remove these non-organic solids so that the waste water can then be treated by oxidation and biodegradation techniques without the non-organic solids fouling or wearing out the mechanical components of the facility. Frequently, the plant design requires that inorganic solids having a specific gravity of 2.65 and higher and a size of 65 mesh or larger should be removed before further treatment of the waste water.

Although it is important that the non-organic solids be removed early in the treatment process, it is equally important that the organic solids such as sewage sludge not be removed at that point. This is because, at that point, the waste water has not been subjected to the oxidation and biodegradation process that clean the water by consuming the sewage. Therefore, if the organic solids are removed along with the inorganic solids before the treatment process, then the removed solids will contain raw sewage which presents difficult problems with the storage and disposal of a possibly hazardous waste.

Fortunately, the inorganic solids are generally distinguishable from the organic solids on the basis of their specific gravities. Inorganic solids such as sand and grit tend to be much denser than organic solids such as sludge. Therefore, inorganic solids tend to settle to the bottom of the fluid stream quicker than organic solids.

In most of the existing waste water treatment facilities, it is this difference in density between inorganic solids and organic solids that it is relied upon to remove the inorganic solids. Typically, the incoming waste water flows through an inorganic removal chamber that may be referred to as "grit chamber". The grit chamber normally operates with a continuous flow through it rather than as a batch at a time. Waste water flows into the chamber through an inlet and out of the chamber through an outlet. At the bottom of the chamber is generally a collection space.

Existing grit chambers include several designs by Weis. In U.S. Pat. No. 3,941,698 by Weis, the grit chamber includes an upper settling chamber and a lower grit storage chamber, with a transition surface dividing the two. Rotating paddles within the settling chamber positioned above the transition surface, cause liquid entering the settling chamber at the outer periphery to rotate about a vertical axis within the chamber to produce a forced vortex. The forced vortex results in an upward spiral flow, so that the flow enters at the settling chamber periphery through an inlet, and flows spirally upward and exits the settling chamber from an outlet, also at the periphery. Dense particles fall through an opening in the transition surface between the settling chamber and the storage chamber coinciding with the vertical axis of the forced vortex.

Variations of the device disclosed in U.S. Pat. No. 3,941,698, discussed above, include those disclosed in U.S. Pat. Nos. 4,107,038 and 4,767,532. Such patents disclose modifications in the settling chamber configuration to enhance the liquid flow. Other devices in the prior art include those disclosed in U.S. Pat. No. 4,519,907 by Rooney.

It has now been discovered that further improvement is possible in the grit chamber efficiency by further modifying the settling chamber configuration. This is important, because the prior art devices result in fairly high turbulence, which interferes with effective and reliable settling and also consumes additional energy. It is also desirable to employ a design which facilitates the removal of finer grits.

SUMMARY OF THE INVENTION

The present invention is an improvement over existing grit chambers, by employing a novel grit chamber configuration which results in more complete grit removal, removal of finer grits, and a reduction in power requirements. Specifically, the grit chamber is a nearly cylindrically cylindrically shaped element having an inlet which introduces in-flowing liquid in a flow path which is not tangential to the axis of the cylinder. Instead, the inlet is an involuted or curved channel which introduces a radial component to the incoming liquid velocity vector to contribute to vortex formation. By so contributing to the vortex formation, the turbulence in the settling chamber is reduced and the power requirements for the mixer drive are lessened.

The lessening of mixer drive power requirements results in lower energy consumption, and lower torsional and bending loads on the mechanical components which allows for the use of smaller motors, speed reducers, gears and shafts. These advantages translate into lower costs of manufacture and also lower maintenance and operational costs. In addition, it is believed that the novel design disclosed herein simplifies the internal configuration of the grit chamber by lessening the need for baffling and the like.

DETAILED DESCRIPTION OF THE INVENTION

Figure 1:
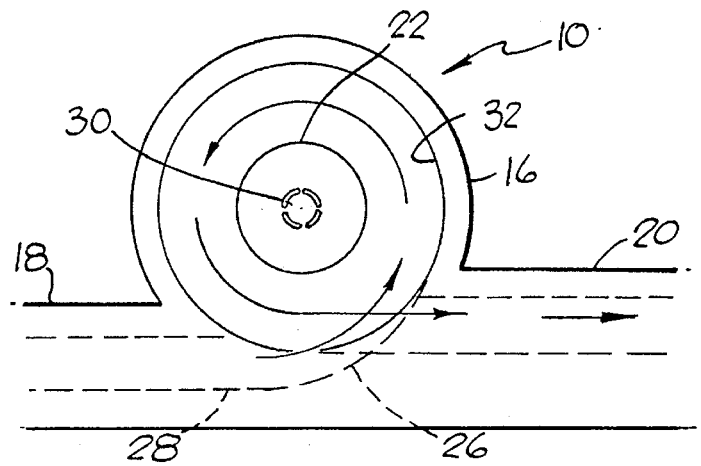
FIG. 1 shows a top schematic view of a grit chamber in accordance with the present invention.

A schematic view of the grit chamber 10 in accordance with the present invention is shown in FIG. 1. The principal elements of the grit chamber 10 include a settling chamber wall 16, an inlet channel 18, an outlet channel 20, and a transition surface divider 22. As shown by the arrows in FIG. 1, incoming waste water moves through the inlet channel 18 and enters the grit chamber 10, specifically the settling chamber 16. The settling chamber 16 is cylindrically-shaped, except in the region receiving the incoming flow from the inlet channel 18. In that region, the outer wall 26 of the inlet channel 18, together with the settling chamber 16 form a transition curve which imparts a radial movement to the incoming waste water. As a result of this, the outer wall 26 at the point where the inlet channel 18 first joins the settling chamber 16, (point 28), is radially more distant from the center 30 of the settling chamber 16, than is the cylindrical portion 32 of the settling chamber 16; thus, the incoming waste water must move radially inward as it flows from the inlet channel 18 into the settling chamber 16. This involute curve as the inlet channel 18 joins the settling chamber 16, and the consequential radial movement of the waste water, results in significantly less turbulence as compared to conventional designs wherein the waste water enters the settling chamber tangentially to the cylinder of the settling chamber.

The outlet 20 for the waste water receives the waste water tangentially to the cylinder of the settling chamber 16. In contrast with the case of the incoming flow through the inlet channel 18, the outgoing flow through the outlet 20 need not be received through an involute curve. For example, a simple outlet that receives the flow tangentially to the cylinder of the settling chamber 16 is acceptable.

Figure 2:
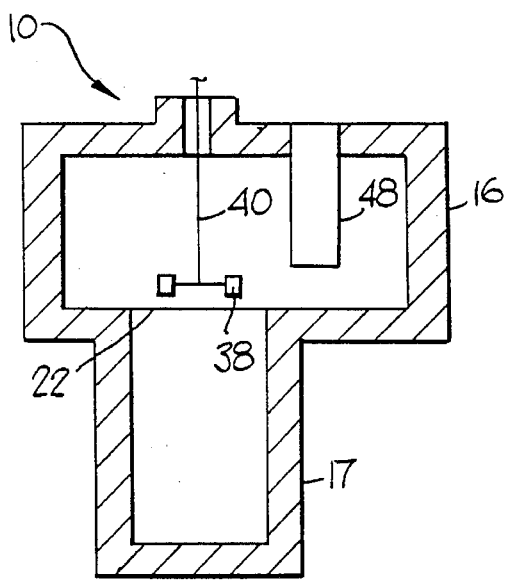
FIG. 2 shows a side sectional view of a grit chamber in accordance with the present invention, viewed toward the liquid outlet.
Figure 3:
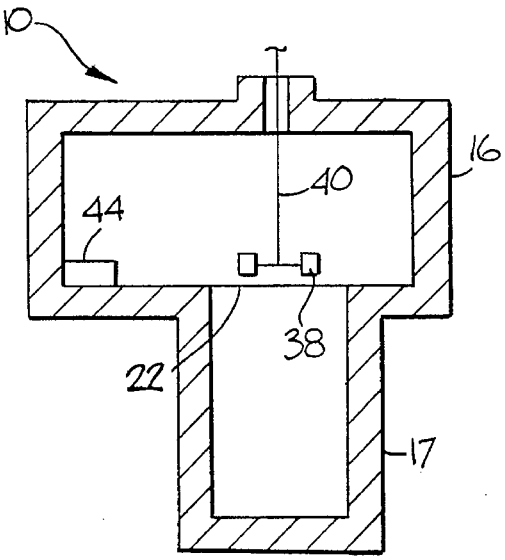
FIG. 3 shows a side sectional view of a grit chamber in accordance with the present invention, viewed toward the liquid inlet.

FIGS. 2 and 3 show side sectional views of the grit chamber 10 through the center 30 (see FIG. 1) of the settling chamber 16. FIG. 2 looks directly toward the outgoing flow, while FIG. 3 looks directly toward the incoming flow. As shown in both FIG. 2 and FIG. 3, the grit chamber 10 includes a settling chamber 16 positioned over a grit collection chamber 17. A transition surface divider or plate 22 may separate the settling chamber 16 from the grit collection chamber 17. A paddle wheel 38 or some other propeller or impeller or flow producing or directing device may be positioned in the settling chamber 16 above the transition surface plate 22 to assist in generating a vortex within the settling chamber 16. The paddle wheel 38 is driven by a shaft 40, which in turn is driven by suitable drive means (not shown).

FIG. 3 shows the inlet 44 for the incoming flow, positioned at the bottom of the settling chamber 16 at the radially outer edge thereof which joins the inlet channel 18 (see FIG. 1). FIG. 2 shows the flow outlet 48, positioned at an elevation higher than the inlet 44 (see FIG. 3) and radially inward from the inlet 44 (see FIG. 3). It can be appreciated that the configuration of the settling chamber 16, having a substantially cylindrical inner surface with a transition portion gradually extending radially outwardly along a curve such as an involute, and the relative positions of the inlet 44 and outlet 48, result in the vortex flow shown by the arrows of FIG. 1.

Figure 4:
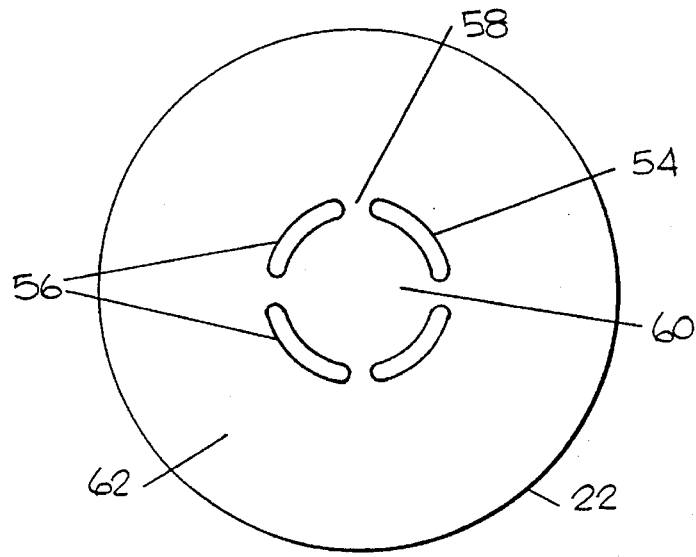
FIG. 4 shows a top view typical of a possible transition surface dividing the grit chamber which may optionally be used with the invention.

FIG. 4 shows an enlarged top view of the transition surface plate 22. In the preferred embodiment shown, the transition surface plate 22 is substantially round, to cover the round upper boundary of the grit collection chamber 17 (see FIGS. 2 and 3). In plate 22 are annular holes 54 made up of a plurality of slots 56 separate by tabs 58, to define a central portion 60. Thus, the plate 22 includes an outer portion 62 and a central portion 60 separated by the annular holes 54, wherein the central portion 60 is supported by the attachment to the outer portion 62 through the tabs 58. Alternately, for example, the transition surface may include a main plate with a hole in the center region, and a center plate that is smaller than the hole and suspended in the hole by a set of clips or other supports to define an annular hole between the center plate on the main plate.

The annular hole 54 allows grit settling from the settling chamber 16 (see FIGS. 2 and 3) to pass through the surface transition plate 22 which divides the settling chamber 16 from the grit collection chamber 17, and into the grit collection chamber 17. Once the grit has settled through the annular hole 54 in the transition surface plate 22 and into the grit collection chamber 17, it can be removed and discarded by techniques known in the art.

In operation, waste water is directed through the inlet channel 18 (see FIG. 1) and passed into the settling chamber 16 through the inlet 44 (see FIG. 3). At that point, the incoming waste water is moving along the involute curve defined by the radially outer edge of the inlet 44 and the radially outer boundary of the settling chamber 16 where it merges with the inlet 44, so that the waste water has both a radial velocity and a tangential velocity. This combined radial and tangential velocity vectors translate the linear movement of the waste water into a circumferential toroidal movement within the cylinder of the settling chamber 16, while imparting a minimum of turbulence to the liquid as compared with prior art systems wherein the incoming flow is directly tangential to the cylinder of the settling chamber.

By means of the insertion of angular momentum, the incoming flow, either with or without the additional movements produced by the paddle wheel 38, generate a forced vortex typical flow pattern in which the liquid flows spirally around and upward through the settling chamber 16. The liquid exits the settling chamber 16 via the outlet 48 (see FIG. 2). The forced vortex causes dense materials such as grit to settle downward and toward the vortex axis which coincides with the cylinder axis of the settling chamber 16. As the grit moves across the upper surface of the transition surface plate 22 toward the center axis, it encounters the annular hole 54 (see FIG. 4) in the transition surface plate 22, and drops through the annular hole 54 into the grit collection chamber 17 (see FIG. 2).

It can be appreciated that variations of the invention are possible without departing from the spirit of the invention. For example, the surface transition plate 22 (see FIG. 4) may have openings therethrough for the passage of grit in a configuration other than what is shown, or may also include a central hole through which gas, sludge and water can pass upward from the grit collection chamber 17 to the settling chamber 16 (see FIGS. 2 and 3). The transition surface plate 22, may be of a non-flat configuration, such as a cone or truncated cone, and may include a large central opening so that it does not substantially cover the grit collection chamber. The outlet may be configured such that waste water exits in a direction other than tangential with respect to the vortex flow.

What is claimed is:

1. A grit collector for use in a waste water treatment facility to separate grit from a liquid stream comprising: a substantially cylindrical settling chamber, a curved liquid inlet connected to the substantially cylindrical settling chamber, said curved inlet having a varying radius of curvature as measured from a centerline of the substantially cylindrical settling chamber; a grit collection chamber disposed beneath the settling chamber; and a liquid outlet in fluid communication with the settling chamber.

2. The grit collector of claim 1, further comprising a device within the settling chamber to propel the liquid in a vortex in the settling chamber.

3. The grit collector of claim 2, further comprising of a divider between the grit collection chamber and the settling chamber, the divider having at least one hole therethrough to allow grit to settle from the settling chamber through the divider and into the grit collection chamber.

4. The grit collector of claim 2, wherein the outlet is disposed in the settling chamber to receive liquid substantially tangentially to the vortex.

5. The grit collector of claim 2, wherein the outlet is disposed in the settling chamber to receive liquid substantially radially to the vortex.

6. The grit collector of claim 1, wherein the liquid outlet and liquid inlet each have a centerline, said centerlines lying in a single plane.

7. The grit collector of claim 3, wherein the outlet is radially inward from the inlet.

8. The grit chamber of claim 7, wherein the settling chamber includes a settling chamber bottom, adjacent said grit collection chamber and the inlet is at the settling chamber bottom and the outlet is above the settling chamber bottom.

9. The grit chamber of claim 8, wherein the inlet and outlet each have a cross-sectional area, and the cross-sectional area of the inlet is less than the cross-sectional area of the outlet, so that a liquid velocity at the inlet is greater than a liquid velocity at the outlet.

10. The grit collector of claim 3, wherein the divider does not substantially cover the grit collection chamber.

11. The grit collector of claim 3, wherein the majority of the surface area of the divider is occupied by a hole or holes.

12. A method for separating grit from a wastewater stream in a waste water treatment facility, comprising: directing the stream into a grit collector through a grit collector inlet; the grit collector having a settling chamber positioned above a grit collection chamber, the settling chamber being divided from the grit collection chamber by a divider with at least one hole therethrough, the settling chamber having a substantially cylindrical portion and a curved inlet connected to the substantially cylindrical settling chamber, said curved inlet having a varying radius of curvature as measured from a centerline of said substantially cylindrical portion; and producing a vortex within the settling chamber by a propeller or impeller in the settling chamber, whereby grit settles downward and radially inward to pass through the divider hole into the grit collection chamber.

13. The method of claim 12, further comprising: flowing the waste water out of the settling chamber through an outlet, the outlet being radially inward from the inlet and above the inlet so that the vortex spirals upward through the settling chamber.

14. The method of claim 13, wherein the outlet and inlet each have cross-sectional areas, and the outlet cross-sectional area is greater than the inlet cross-sectional area so that the step of flowing the waste water out of the outlet includes reducing the flow speed of the waste water relative to the flow speed of the inlet.

* * * * *